US008424075B1

United States Patent
Walsh et al.

(10) Patent No.: US 8,424,075 B1
(45) Date of Patent: Apr. 16, 2013

(54) COLLABORATIVE FIREWALL FOR A DISTRIBUTED VIRTUAL ENVIRONMENT

(75) Inventors: Richard J. Walsh, Raleigh, NC (US); James Evans, Apex, NC (US); Kunal Kandekar, Jersey City, NJ (US)

(73) Assignee: Qurio Holdings, Inc., Raleigh, NC (US)

( * ) Notice: Subject to any disclaimer, the term of this patent is extended or adjusted under 35 U.S.C. 154(b) by 561 days.

(21) Appl. No.: 12/644,219

(22) Filed: Dec. 22, 2009

Related U.S. Application Data

(60) Provisional application No. 61/141,721, filed on Dec. 31, 2008.

(51) Int. Cl.
*G06F 9/00* (2006.01)

(52) U.S. Cl.
USPC ............................................... 726/11; 726/14

(58) Field of Classification Search .................. None
See application file for complete search history.

(56) References Cited

U.S. PATENT DOCUMENTS

| | | | |
|---|---|---|---|
| 6,377,263 B1 | 4/2002 | Falacara et al. | |
| 6,798,407 B1 | 9/2004 | Benman | |
| 6,912,565 B1* | 6/2005 | Powers et al. | 709/205 |
| 7,181,690 B1* | 2/2007 | Leahy et al. | 715/706 |
| 7,269,632 B2 | 9/2007 | Edeker et al. | |
| 7,493,558 B2 | 2/2009 | Leahy et al. | |
| 7,685,224 B2 | 3/2010 | Nye | |
| 7,814,153 B2* | 10/2010 | Flesch et al. | 709/205 |
| 7,814,154 B1* | 10/2010 | Kandekar et al. | 709/205 |
| 7,831,707 B2 | 11/2010 | Bardsley | |
| 8,000,328 B1* | 8/2011 | Kandekar et al. | 370/392 |
| 2003/0167410 A1* | 9/2003 | Rigstad et al. | 713/201 |
| 2003/0177187 A1* | 9/2003 | Levine et al. | 709/205 |
| 2005/0203922 A1 | 9/2005 | Uhlir et al. | |
| 2006/0253901 A1* | 11/2006 | Roddy et al. | 726/11 |
| 2006/0258462 A1* | 11/2006 | Cheng et al. | 463/42 |
| 2007/0083929 A1* | 4/2007 | Sprosts et al. | 726/22 |
| 2007/0271301 A1 | 11/2007 | Klive | |
| 2007/0288598 A1 | 12/2007 | Edeker et al. | |
| 2008/0090659 A1 | 4/2008 | Aguilar et al. | |
| 2008/0163358 A1* | 7/2008 | Conti | 726/15 |
| 2008/0207327 A1* | 8/2008 | Van Luchene et al. | 463/42 |
| 2009/0265755 A1* | 10/2009 | Hamilton et al. | 726/1 |
| 2010/0057478 A1* | 3/2010 | Hamilton et al. | 705/1 |
| 2010/0146608 A1* | 6/2010 | Batie et al. | 726/7 |
| 2010/0162403 A1* | 6/2010 | Dawson et al. | 726/26 |

FOREIGN PATENT DOCUMENTS

| | | |
|---|---|---|
| WO | 03/081447 A1 | 10/2003 |
| WO | 2006/022685 A1 | 3/2006 |

OTHER PUBLICATIONS

Choo, R.K.K. et al., Criminal Exploitation of Online Systems by Organised Crime Groups, Nov. 15, 2007, Asian Criminology (2008) 3:37-59, Springer, DOI 10.1007/s11417-007-9035-y.*

(Continued)

*Primary Examiner* — Jeffrey Pwu
*Assistant Examiner* — Carlos Amorin
(74) *Attorney, Agent, or Firm* — Withrow & Terranova, PLLC

(57) ABSTRACT

A virtual environment firewall receives a message having a request from a virtual environment entity intended for a virtual environment controller. The virtual environment firewall determines whether the request complies with one or more governance rules of the virtual environment controller. If the request does not comply with the one or more governance rules, the virtual environment firewall processes the message to prevent the request from being processed by the virtual environment controller.

15 Claims, 13 Drawing Sheets

OTHER PUBLICATIONS

Graham Morgan, "An Introduction to Distributed Virtual Environment Research (Using Ten Quick Questions and Answers)," <http://homepages.cs.ncl.ac.uk/graham.morgan/dve.htm>, dated Aug. 25, 2008.

David Greenfield, "IBM and Linden Partner on Enterprise-Class Second Life," <http://blogs.zdnet.com/Greenfield/?p=213>, dated Jun. 30, 2008.

Richard Luo, "Collaborative Firewall Protocol," <http://www.cs.ucla.edu/~lc/paper/colfw.doc>, dated Jun. 2002.

Robin Linden, "Identity Verification Comes to Second Life," <https://blogs.secondlife.com/community/features/blog/2007/08/29/identity-verification-comes-to-second-life>, Aug. 29, 2007.

"Virtual World of Kaneva Community: Frequently Asked Questions," printed from the Internet prior to Dec. 31, 2008.

"Virtual World of Kaneva Elite Developers: About the Kaneva Game Platform," printed from the Internet prior to Dec. 31, 2008.

\* cited by examiner

```
70
 ⎧ <rule>
72 ⎯ <name>BlockBannedUserAvatars</name>
74 ⎯ <description>Block bad user avatars from entering my region of the virtual environment
      </description>
76 ⎯ <initialization-function>startup();</initialization-code>
      <periodic-function>
          <timeframe>
              <unit>Time.MINUTE</unit>
              <quantity>10</quantity>
          </timeframe>
          <function>reload();</function>
      </periodic-function>
      ⎧<message-criteria>
78 ⎯⎨     <message-type>VirtualObjectTransferAnnouncement</message-type>
      ⎩</message criteria>
      <message-detection-function>messageDetected();</message-detection-function>
80 ⎯ <code>
          // the list containing the names of banned avatars
          List bannedAvatars;

// called when the rule is initialized by the firewall
          function startup() {
              // create the list that contains the names of banned avatars
              bannedAvatars = new List();
              // load the names from the database
              loadFromDatabase();
          }

// called periodically (every 10 minutes) so that I have the latest information
          // in memory
          function reload() {
              // clear the current list
              bannedAvatars.clear();
              // load the names from the database
              loadFromDatabase();
          } function loadFromDatabase() {
              ResultSet resultSet = Database.query( "select avatar_name from banned_users");
      foreach ( result : resultSet ) {
                  String avatarName = result.getField(1);
                  bannedAvatars.add( avatarName );
              }
          }
```

*FIG. 5A*

```
function messageDetected( Message message ) {
    if ( message.isTransferForClientAvatar() == true ) {

// it's a user's avatar transferring, one of the bad ones?
        String avatarName = message.getVirtualObjectName();
        if ( bannedAvatars.contains( avatarName ) == true ) {

// yes, reject the transfer by sending a rejection message and
            // by canceling the current transfer announcement message // create the rejection message
            Message rejectionMessage = createTransferRejectionMessage();
            rejectionMessage.setReason( "Banned User" );
            rejectionMessage.setDestination( message.getSource() );

/// send the message
            MessagingComponent.sendMessage( rejectionMessage );

// indicate that this message should be canceled (aka not processed)
            return MessagingComponent.CANCEL_MESSAGE;
        }
    }

// indicate the message is okay and can continue to be processed
    return MessagingComponent.ACCEPT_MESSAGE;
}
</code>
</rule>
```

*FIG. 5B*

```
70
 ⌇
  <rule>
72⌇ <name>Prehistoric Theme</name>
74⌇ <description>Only allow prehistoric themed virtual objects to enter</description>
     ⎧ <message-criteria>
78⌇ ⎨       <message-type>VirtualObjectTransferAnnouncement</message-type>
     ⎩ </message criteria>
       <message-detection-function>messageDetected();</message-detection-function>
80⌇ <code>
         function isPrehistoric( VirtualObject virtualObject ) {
                return Ontology.classifiedCloseTo( "Prehistoric", virtualObject ) == true;
         } function messageDetected( Message message ) {

VirtualObject virtualObject = message.getVirtualObject();

// compare the classification of the virtual object to "Prehistoric"...
                if ( isPrehistoric( virtualObject ) == true ) {

// the virtual object is classified as being closely related, its ok
                        // to let in // indicate the message is okay and can continue to be
                        // processed
                        return MessagingComponent.ACCEPT_MESSAGE;
                } else {
                        // not a prehistoric related virtual object, create/send rejection and
                        // cancel the message // create the rejection message
                        Message rejectionMessage = createTransferRejectionMessage();
                        rejectionMessage.setReason( "Not qualified for Prehistoric region" );
                        rejectionMessage.setDestination( message.getSource() );

/// send the message
                        MessagingComponent.sendMessage( rejectionMessage );

// indicate that this message should be canceled (aka not
                        // processed)
                        return MessagingComponent.CANCEL_MESSAGE;
                }
         }
  </code>
  </rule>
```

*FIG. 6*

```
70
 ⸺<rule>
72 ⸺ <name>StalledVirtualObject</name>
74 ⸺ <description>Updates the firewall when the virtual object engine detects
              a virtual object is no longer responding to messages</description>
        ...
        ...
        ...
82 ⸺ <notification-methods>
     84A ⸺ <notification-method>
          86 ⸺ <instant-messenger>
                    <system>Yahoo</system>
                    <account>johndoe</account>
                    <message>Stalled Virtual Object</message>
                    <include-stack-trace>true</include-stack-trace>
               </instant-messenger>
          </notification-method>
     84B ⸺ <notification-method>
          88 ⸺ <client-avatar-selection>
                    <radius>200</radius>
                    <unit>meter</unit>
               </client-avatar-selection>
               <client-avatar-message>Due to technical difficulties,
               %virtual_object_name% is being brought offline. Sorry for any
               inconvenience.</client-avatar-message>
          </notification-method>
     </notification-methods>

</rule>
```

*FIG. 7*

```
90 ──<configuration-message>
     92 ──<description>Updated isPrehistoric : added check for Jurassic</description>
     94 ──<rule-update>
          96 ──<name>Prehistoric Theme</name>
          98 ──<code>
                    function isPrehistoric( VirtualObject virtualObject ) {
                         if ( Ontology.classifiedCloseTo( "Prehistoric",
                         virtualObject ) == true )
                              return true;
                         else if ( Ontology.classifiedCloseTo( "Jurassic",
                         virtualObject ) == true )
                              return true;
                         else
                              return false;
                    }
          </code>
     </rule-update>
</configuration-message>
```

*FIG. 9*

100 — `<notification-message>`
102 — `<virtual-object-id>12345</virtual-object-id>`
104 — `<problem>TooManyMessages</problem>`
106 — `<virtual-world-location>`
    `<x>678</x>`
    `<y>901</y>`
    `<z>23</z>`
`</virtual-world-location>`
`<time>Tue May 1 19:30:19 EDT 2007</time>`
`</notification-message>`

*FIG. 10*

```
110 ─── <notification-action>
    112 ─── <importance-criteria>
                <score-range-start>85</score-range-start>
                <score-range-end>100</score-range-end>
            </importance-criteria>
    114 ─── <code>
                function action( Message message ) {
                    // get the virtual object associated with the notification message
                    VirtualObject virtualObject = message.getVirtualObjectReferenced();

// create a rule to block all message traffic associated with that
                    // virtual object
                    Firewall.createRule(Rule.PERMANENT,Rule.
                    BLOCK_ALL,virtualObject.getID() );
                }
            </code>
        </notification-action>
```

*FIG. 11*

COLLABORATIVE FIREWALL FOR A DISTRIBUTED VIRTUAL ENVIRONMENT

This application claims the benefit of provisional patent application Ser. No. 61/141,721, filed Dec. 31, 2008, the disclosure of which is hereby incorporated herein by reference in its entirety.

FIELD OF THE INVENTION

The present invention relates to virtual environments, and in particular to a firewall for a distributed virtual environment.

BACKGROUND OF THE INVENTION

Virtual environments are widely used for training, gaming, and other purposes. Such virtual environments usually feature a computer-generated landscape that may represent an actual or imaginary location in a past, present, or future time. Users can create computer-generated virtual objects, referred to as avatar virtual objects, and control the avatars in the landscape through client software that runs on a computing device. Avatars can typically roam the landscape and interact with other users' avatars and with other computer-generated virtual objects. Typically, a virtual environment is generated and implemented by a single entity, and any computing devices that participate in the virtual environment are either owned or controlled by the entity that implements the virtual environment, or execute proprietary software provided by the entity. Due to the control inherent in proprietary software, the ability for a third party to compromise, or 'hack,' such a virtual environment is limited.

There is increasing interest in distributed virtual environments, where different regions of a virtual environment are implemented on different computing devices, or hosts. Disparate entities might generate and own different regions within such a virtual environment. In order for such a virtual environment to effectively operate, architectural information must be made available regarding how hosts communicate with each other and how client software communicates with hosts. Moreover, for many such virtual environments, there must be a set of rules governing behavior of the host and client computing devices. One disadvantage of making such architectural information generally available is that it eases the development by third parties of compromising software that does not abide by the rules of the virtual environment. Conventional firewall software focuses on viruses and network attacks, and would be unable to detect errant behavior associated with a virtual environment. Thus, there is a need for an application-layer virtual environment firewall that protects the virtual environment from virtual entities, such as hosts, clients, and virtual objects, that either intentionally or unintentionally do not abide by the rules of the virtual environment.

SUMMARY OF THE INVENTION

The present invention provides a rule-based application-layer virtual environment firewall that determines whether a request from a virtual environment entity complies with one or more governance rules. If the request does comply with the one or more governance rules, the request can be passed to a virtual environment controller for processing. If the request does not comply with the one or more governance rules, the virtual environment firewall prevents the request from being processed by the virtual environment controller. The virtual environment firewall can load or otherwise obtain access to a plurality of rules that govern respective behaviors in a region of the virtual environment. Each of the plurality of rules can identify criteria indicating the requests to which the plurality of rules should be applied. For example, a rule verifying that an avatar attempting to transfer into the region is not a banned avatar may only be associated with an avatar transfer request. The virtual environment firewall can apply each rule to each request matching the rule criterion. For each rule that is applied, it may be determined that the request complies with the governance rule and that no action is necessary. Alternately, it may be determined that the request does not comply with the governance rule and the virtual environment firewall may prevent the request from being processed by the virtual environment controller.

According to one embodiment of the invention, an avatar may initiate an avatar transfer request to a virtual environment controller as the avatar attempts to transfer from a first region of the virtual environment to a second region of the virtual environment. The virtual environment firewall associated with the second region may receive the avatar transfer request and determine that a rule associated with avatar transfer requests exists. The virtual environment firewall may apply the rule and determine that the avatar making the avatar transfer request is on a list of banned avatars. The avatar may be identified on the list based on previous errant behavior by the avatar in the second region, or through an authenticated configuration or notification message received from another virtual environment firewall. The virtual environment firewall may prevent the avatar transfer request from being processed by the virtual environment controller. According to one embodiment of the present invention, if a request does not comply with a governance rule, in addition to preventing the request from being processed by the virtual environment controller, a virtual environment entity can be presented into the virtual environment to reinforce the governance rule. For example, in the example of a banned avatar requesting a transfer to a virtual environment region, the virtual environment firewall or the virtual environment controller may generate and present a virtual environment object between the avatar and a border of the second region to prevent the avatar from entering the second region.

According to one embodiment of the present invention, the virtual environment firewall in a first region of the virtual environment can collaborate with a virtual environment firewall in a second region of the virtual environment. The virtual environment firewall in the first region may receive a configuration message from the virtual environment firewall in the second region requesting that a new rule governing behavior in the first region be created, or that an existing rule be modified. The virtual environment firewall in the first region authenticates the configuration message by verifying that the sender of the configuration message has the appropriate credentials. Authentication can include private and public key verification. If the configuration message is verified, the configuration message can be applied and an owner of the first region can be notified of the configuration change. If the configuration message is not verified, the virtual environment firewall in the first region may generate a new rule rejecting messages sent by the virtual environment firewall in the second region. Alternately, the virtual environment firewall in the first region may receive a notification message from the virtual environment firewall in the second region. If the notification message is verified, the virtual environment firewall in the first region may forward the notification to one or more virtual entities in the first region, or to an owner of the first region.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 5A and 5B illustrate an exemplary governance rule governing a behavior in one of the regions illustrated in FIG. 2.

FIG. 6 illustrates another exemplary governance rule governing a behavior in one of the regions illustrated in FIG. 2.

FIG. 7 is an exemplary notification block of a governance rule according to one embodiment of the present invention.

FIG. 9 is an exemplary configuration message received by a virtual environment firewall according to one embodiment of the invention.

FIG. 10 is an exemplary notification message received by a virtual environment firewall according to one embodiment of the present invention.

FIG. 11 is an exemplary notification action code segment executed upon determining that a notification importance exceeds a threshold importance.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
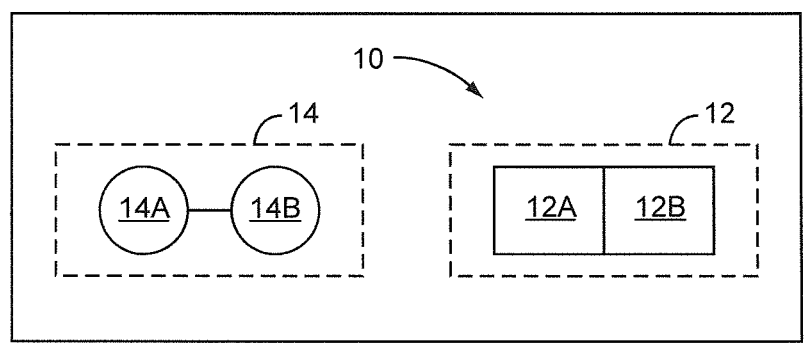
FIG. 1 is a block diagram illustrating a relationship between hosts and regions in a virtual environment according to one embodiment of the present invention.

Referring now to FIG. 1, a block diagram illustrating a relationship between hosts and regions in a virtual environment is shown according to one embodiment of the present invention. A virtual environment 10 can be a two or three dimensional computer simulated environment. The virtual environment 10 typically comprises a rendering of a real or an imaginary landscape upon which virtual objects can roam and interact. The virtual environment 10 may have multiple regions 12, such as regions 12A and 12B. For the sake of brevity, the regions 12A and 12B may be referred to herein singularly as the region 12 or collectively as the regions 12 where the discussion is not limited to a specific region 12A or 12B. It should be understood that the invention described herein is not limited to a particular number of regions 12, and that the regions 12A and 12B are used herein merely for illustrative purposes.

The regions 12A and 12B are hosted by hosts 14A and 14B, respectively. The hosts 14A and 14B can comprise any processing device capable of hosting a region 12 as described herein, and can comprise, for example, a general purpose computer executing a commercially available operating system, such as Microsoft Windows or Linux. If the particular processing device has sufficient capabilities, a single processing device may host more than one region 12. For the sake of brevity, the hosts 14A and 14B may be referred to herein singularly as the host 14 or collectively as the hosts 14 where the discussion is not limited to a specific host 14A or 14B. The hosts 14A and 14B have myriad responsibilities relating to the respective regions 12A and 12B, including monitoring activity in the regions 12A and 12B, handling message traffic generated by virtual objects roaming the regions 12A and 12B, coordinating the transfer of virtual objects from one region 12 to the other region 12, and the like. The hosts 14A and 14B can communicate with each other and with client devices that control virtual object avatars (not shown) via conventional data communication technologies, such as wired or wireless communication technologies, and can use any public or proprietary packet transport protocols, such as Transmission Control Protocol/Internet Protocol (TCP/IP) or Internetwork Packet Exchange/Sequenced Packet Exchange (IPX/SPX).

Figure 2:
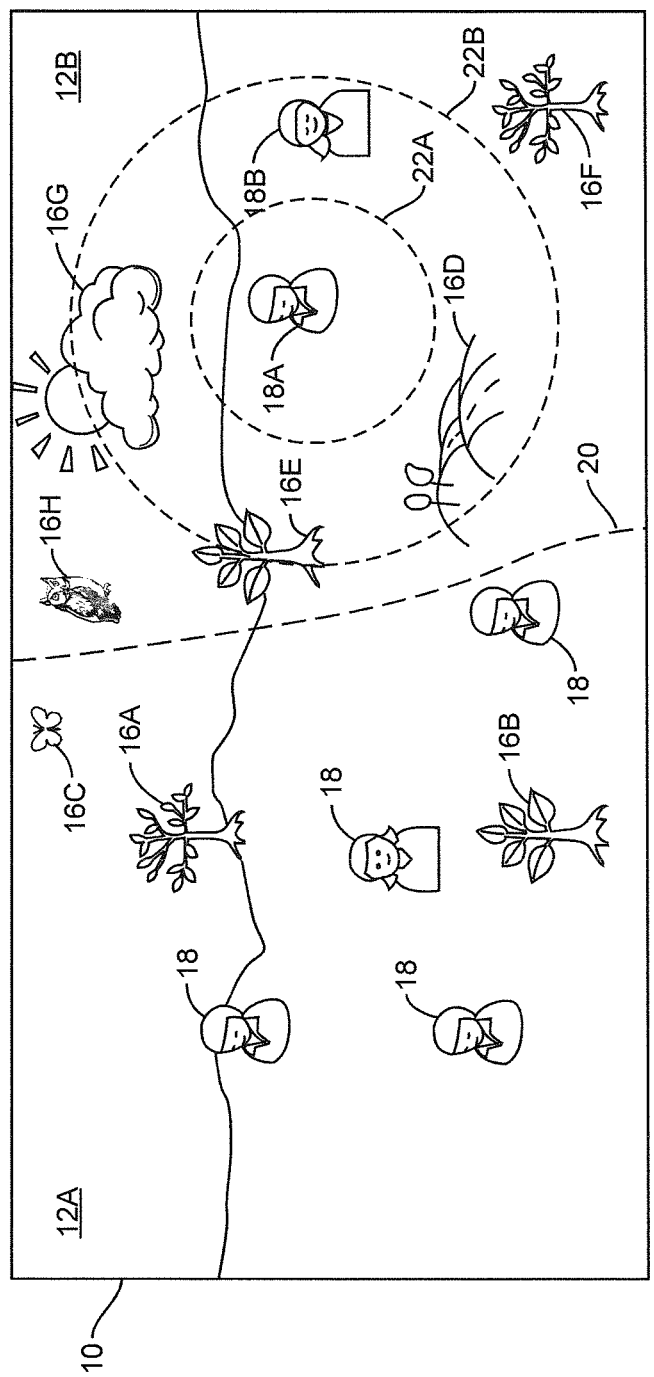
FIG. 2 is a diagram illustrating the regions shown in FIG. 1 in greater detail.

FIG. 2 is a diagram illustrating the regions 12A and 12B shown in FIG. 1 in greater detail. A plurality of virtual objects 16A-16C is shown in the region 12A and a plurality of virtual objects 16D-16H are shown in the region 12B. Virtual objects help simulate reality in the virtual environment 10. For the sake of brevity, the virtual objects 16A-16H may be referred to herein singularly as the virtual object 16 or collectively as the virtual objects 16 where the discussion is not limited to a specific virtual object 16A-16H. Virtual objects can comprise relatively static objects that primarily provide ambience to the virtual environment 10, such as, for example, the virtual objects 16A and 16B. Virtual objects 16 can also comprise dynamic virtual objects 16 with artificial intelligence controlled by a respective host 14, such as, for example, the virtual objects 16C and 16H. Virtual objects 16 can also comprise user-controlled avatars 18, which are representations of a respective user that roam the virtual environment 10. Each avatar 18 is controlled by a respective user via client software executing on a processing device that communicates with the hosts 14A and 14B, as appropriate. Typically, a border 20 separates the regions 12A and 12B, although the existence of the border 20 may not be apparent to a user controlling an avatar 18. As used herein, virtual objects 16 exhibiting artificial intelligence, such as the virtual objects 16C and 16H, will sometimes be referred to as computer-controlled virtual objects, and avatars 18 will sometimes be referred to as user-controlled virtual objects.

Virtual objects 16 typically have an associated virtual object template that defines attributes relating to the respective virtual object 16. The virtual object template can define attributes such as size, color, location, and, if the respective virtual object 16 is a dynamic virtual object, the virtual object template can define behavioral attributes. For example, with respect to the butterfly virtual object 16C, the virtual object template may include information about flying, eating, and standing, and how the butterfly virtual object 16C should respond to certain events. The virtual object template may also include 3D graphics model information so that a 3D engine (not shown) can render the virtual object 16 appropriately. Each instance of a virtual object template is for a separate virtual object 16 with its own set of attributes.

Virtual objects 16 also typically have an associated area of interest (AOK) that defines the area or volume within which the respective virtual object 16 can perceive events occurring in the virtual environment 10. A virtual object can have different AOIs for different perceptions. For example, an AOI for sounds may be different than an AOI for sights. However, for brevity and illustration purposes, virtual objects 16 will be discussed herein as having a single AOI for all perceptions. An AOI is used to determine which messages are relevant to a particular virtual object. Virtual objects 16 also have an associated aura that defines the area or volume within which an action of the respective virtual object can be perceived. For example, the owl virtual object 16H may define an aura such that the butterfly virtual object 16C can hear the owl hoot, but the avatar 18A cannot hear the owl hoot. The AOI and aura of a respective virtual object 16 need not be coextensive.

The virtual environment 10 is primarily message driven. Activities by a virtual object 16 result in message generation and communication to a respective host or client, as appropriate. For example, if the avatar 18A is moved two steps from its current location, the associated client software informs the host 14B of this movement. The host 14B in turn informs any other virtual objects 16 in the region 12B that should be aware of the movement of the avatar 18A via messages. AOIs of virtual objects 16 may be used to determine which virtual objects 16 need to be aware of such movement. Likewise, if the owl virtual object 16H flies over the avatar 18A, the host 14B informs the client software associated with the avatar 18A of this movement. Message communication between the hosts 14A and 14B may be necessary. For example, if the avatar 18A crosses the border 20 into the region 12A, the host 14B and the host 14A may engage in message communication to transfer information associated with the avatar 18A from the host 14B to the host 14A.

Although many conventional virtual environments are generated and controlled by a single entity using proprietary technology, according to one embodiment of the present invention, the hosts 14A and 14B are not controlled by the same entity, and the respective regions 12A and 12B are created relatively independently of one another by separate entities. However, to ensure a coherent and consistent virtual environment 10 in which virtual objects 16 can move from one region 12 to another region 12, the hosts 14A and 14B comply with certain communication and architectural specifications that ensure compatibility between the hosts 14A and 14B and any appropriate client software. Such distributed virtual environments 10 are becoming increasingly popular. Unfortunately, a negative consequence of publishing or otherwise making available technical details about the implementation of the virtual environment 10 is the increased likelihood that an entity will utilize such information to cause harm in one way or another to the virtual environment 10. For example, an entity may choose to develop a computer controlled-virtual object 16 that floods other virtual objects 16 with chat messages, ultimately causing the respective host 14 associated with the region 12 to become overloaded with messages and fail. Alternatively, an entity may attempt to change an attribute of a respective avatar 18 so the avatar 18 has an advantage over other avatars 18.

The present invention is an application-layer virtual environment firewall that protects the virtual environment 10 by receiving messages that have a request, determining if the request complies with one or more governance rules, and if not, processing the message to prevent the request from being processed by a virtual environment controller. The phrase "application-layer" means the virtual environment firewall is application-layer aware and capable of processing messages containing requests that relate to activities in the virtual environment 10, above and beyond transport information identified in a header of the message, such as source destination addresses. The governance rules are in addition to the conventional rules used by a virtual environment controller to provide a virtual environment region. For example, a virtual environment controller imposes a variety of rules that dictate mechanics in a virtual environment, such as preventing avatars from walking through other virtual objects, preventing automobiles from driving on water, preventing fish from flying, and the like. Governance rules as used herein apply to requests that may be inappropriate or otherwise unsuitable for the virtual environment. In contrast to a proprietary virtual environment where a single entity controls communications and requests between virtual entities, a need for governance rules becomes particularly important in the context of a distributed virtual environment where a virtual environment controller has no reason to trust that a request received from a virtual entity is a reasonable or compliant request. The phrase 'virtual entity' will be used to refer to any entity in the virtual environment 10 that is capable of making requests, including, for example, the hosts 14A and 14B, the virtual objects 16A-16H, the avatars 18, and the like.

The virtual environment firewall of the present invention analyzes certain message traffic that has requests, and ensures that the requests comply with rules that govern a behavior in the virtual environment 10 before such requests are processed by a virtual environment controller responsible for providing and otherwise managing the respective virtual environment region. Requests suitable for processing by the virtual environment firewall can comprise any message directed toward a virtual environment module, such as the respective virtual environment controller or virtual environment firewall. Requests may comprise, for example, virtual object transfer requests, virtual object attribute modification requests, communication requests, requests for information from other virtual environment controllers, requests to modify information maintained by the virtual environment controller, and the like. Requests are typically sent in the virtual environment 10 in the form of a message, which may include one or more requests and may include routing information, status indicators, and the like, in addition to the request.

Preferably, each host 14 has a respective virtual environment firewall that protects the respective region 12. For example, for the purposes of illustration assume that the butterfly virtual object 16C has been identified by the virtual environment firewall associated with the region 12B as a malicious virtual object. As the butterfly virtual object 16C attempts to cross the border 20 into the region 12B, a virtual object transfer request is received by the virtual environment firewall. The virtual environment firewall can apply a rule that is associated with virtual object transfer requests, and the rule determines that the butterfly virtual object 16C is on a list of banned virtual objects. The virtual environment firewall can process the virtual object transfer request to prevent the virtual environment controller from processing the request, thereby keeping the butterfly virtual object 16C from entering the region 12B. The virtual environment firewall can also collaborate with other virtual environment firewalls and, for example, may send a notification to the virtual environment firewall associated with the region 12A notifying the virtual environment firewall of the host 14A that the butterfly virtual object 16C is known to be a malicious virtual object.

According to one embodiment of the invention, in addition to preventing a request from being processed by the virtual environment controller, the virtual environment firewall or the virtual environment controller can also alter the virtual environment 10 to visually or otherwise represent to the virtual entity issuing the request that the request is not being processed. For example, upon determining that the butterfly virtual object 16C is a banned virtual object 16, the virtual environment firewall associated with the region 12B can generate an owl virtual object 16H and place the owl virtual object 16H proximate to the butterfly virtual object 16C such that the butterfly virtual object 16C will be eaten if it chooses to enter the region 12B. Alternately, the virtual environment firewall can pass the message to the virtual environment controller and indicate to the virtual environment controller that the request violates a governance rule. The virtual environment controller can receive the message, determine that the request should not be processed, and introduce the owl virtual object 16H proximate to the butterfly virtual object 16C such that the butterfly virtual object 16C will be eaten if it chooses to enter the region 12B.

As another example of a governance rule, assume that a virtual object, such as the avatar 18A, has an AOI defined by a circle 22A. The avatar 18A generates and sends a message having an AOI request requesting a much larger AOI defined by a circle 22B. The virtual environment firewall receives the messages and applies a rule associated with AOI requests that governs the size of AOIs in the region 12B. The rule determines that the requested AOI defined by the circle 22B exceeds the permitted size of an AOI and processes the message to prevent the virtual environment controller from processing the request. According to one embodiment of the invention, although the original request is not processed, a request may be modified such that it complies with a governance rule, and the modified rule may be processed by the virtual environment controller. For example, in the preceding example, the virtual environment firewall can alter the request such that the requested AOI is of a maximum size allowed under the governance rules. The virtual environment firewall can then pass the modified request to the virtual environment controller for processing.

Figure 3:
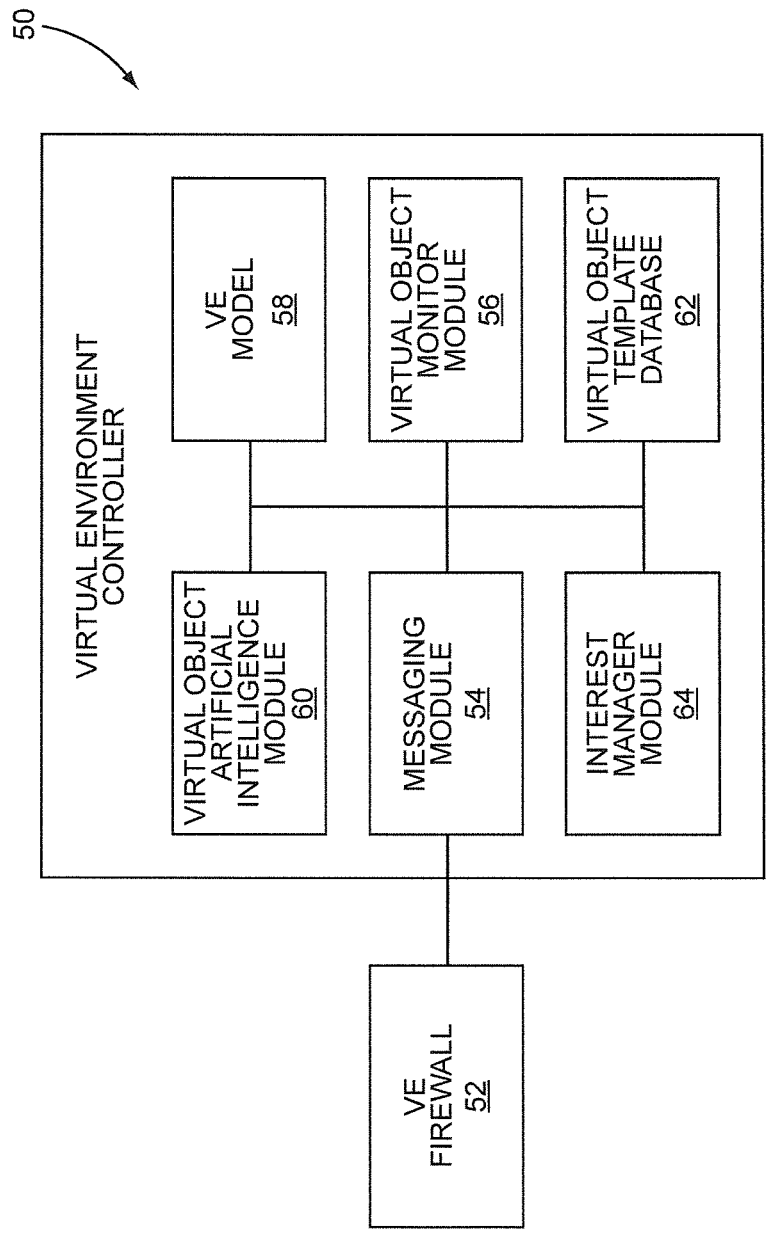
FIG. 3 is a block diagram illustrating a virtual environment controller and a virtual environment firewall according to one embodiment of the present invention.

FIG. 3 is a block diagram illustrating a virtual environment controller and a virtual environment firewall according to one embodiment of the present invention. It will be assumed for purposes of illustration that the virtual environment controller 50 is associated with the region 12B hosted by the host 14B. The virtual environment controller 50 includes a plurality of different modules used to provide, manage, and otherwise operate the region 12B. The virtual environment firewall 52 processes requests received by a messaging module 54 before such requests are delivered to an intended module of the virtual environment controller 50. Such requests may originate external to the respective host 14 with which the virtual environment controller 50 is associated, or they may originate from a virtual object in the region 12 controlled by the virtual environment controller 50.

The virtual environment firewall 52 is illustrated in FIG. 3 as being separate from the virtual environment controller 50, and can comprise a separate module executing on a host 14 that also executes the virtual environment controller 50, or can comprise a separate apparatus that communicates with the virtual environment controller 50 over a network. Alternately, the virtual environment firewall 52 can comprise a module within the virtual environment controller 50. The virtual environment firewall 52 preferably operates in conjunction with the messaging module 54. The messaging module 54 receives messages that originate from virtual environment entities that are external to the virtual environment controller 50 and passes the messages to the appropriate module within the virtual environment controller 50. The messaging module 54 is also responsible for sending messages that the messaging module 54 receives from modules within the virtual environment controller 50 to virtual environment entities external to the virtual environment controller 50. The messaging module 54 can provide messages to the virtual environment firewall 52. The virtual environment firewall 52, upon receiving a message, determines whether the message includes a request that matches criteria specified by one or more respective rules. If so, the virtual environment firewall 52 applies the rules to the request and, if the request does not comply with the rule, the virtual environment firewall 52 processes the message to prevent the request from being processed by the virtual environment controller 50.

The messaging module 54 provides a means by which the virtual environment controller 50 communicates with clients connected to the host 14B and other virtual environment controllers in the distributed virtual environment 10. In a preferred embodiment, the messaging module 54 automatically sends each message it receives from virtual environment entities external to the virtual environment controller 50 to the virtual environment firewall 52. Alternatively, the messaging module 54 may expose an application programming interface (API) that allows other modules, including the virtual environment firewall 52, to register a callback by the messaging module 54 for each request that matches a criterion identified by a rule. The messaging module 54 preferably allows the virtual environment firewall 52 full access to the request, including the ability to cancel the request and modify or replace the request.

The virtual environment controller 50 can also include a virtual object monitor module 56 that is responsible for monitoring aspects of the respective region 12B. For example, the virtual environment firewall 52 can direct the virtual object monitor module 56 to monitor a 'health' state attribute of a virtual object written by an unknown author. The virtual object monitor module 56 can determine if such virtual object refuses to reduce its health or enter a 'dead' state according to rules of the virtual environment 10. In response to such determination, the virtual environment firewall 52 can update a rule associated with virtual object transfer requests and identify the virtual object as a banned virtual object.

The virtual environment controller 50 can also include a virtual environment model 58 that represents the state of virtual objects in the region 12B. The virtual environment model 58 can be persisted in a central or distributed database and/or maintained in a memory associated with the virtual environment controller 50.

A virtual object artificial intelligence module 60 is responsible for simulating the artificial intelligence associated with dynamic virtual objects, such as the virtual objects 16C and 16H (FIG. 2). The virtual object artificial intelligence module 60 can interact with the virtual environment firewall 52 to monitor conditions that represent virtual object simulation anomalies, such as a large backlog of messages to process, too much processing time, or an excess or lack of messages. The virtual environment firewall 52 can also interact with the virtual object artificial intelligence module 60 to impose artificial intelligence control rules governing the execution of the virtual object. For example, the virtual environment firewall 52 may allow a lion virtual object to enter into the region 12B.

The virtual environment firewall 52 may provide artificial intelligence rules to the virtual object artificial intelligence module 60 that the lion virtual object has a speed slightly faster than the average speed of virtual object prey that the lion virtual object hunts.

A virtual object template database 62 stores virtual object templates used by the virtual environment controller 50 to operate the region 12B. The virtual object template database 62 may include a complete or partial listing of templates available in the entire virtual environment 10. Such templates may be obtained from a central server, such as a virtual world authority, or from other virtual environment controllers 50 in the distributed virtual environment 10. An interest manager module 64 is used by other modules in the virtual environment 10 to register AOIs and auras. The interest manager module 64 works in conjunction with the virtual environment firewall 52 to ensure that virtual objects register AOIs and auras that are within the rules of the virtual environment 10.

Figure 4:
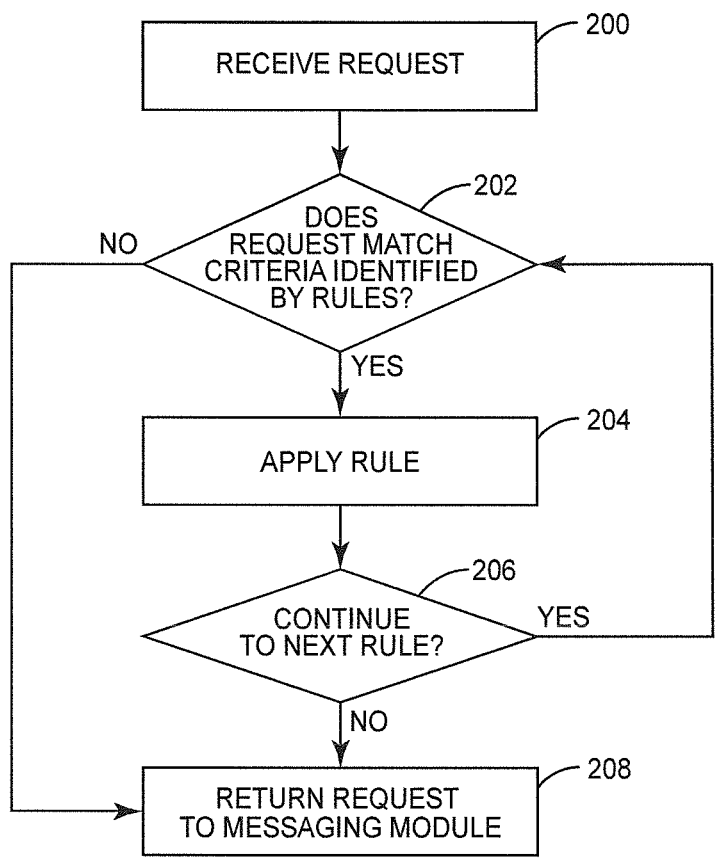
FIG. 4 is a flow diagram illustrating a process for applying governance rules to requests according to one embodiment of the present invention.

FIG. 4 is a flow diagram illustrating a process for applying governance rules to requests according to one embodiment of the present invention. A request in the form of a message is received by the messaging module 54 (step 200). Preferably, the request is inspected and processed by the virtual environment firewall 52 prior to adding the request to a received message queue. Alternatively, the virtual environment firewall 52 may apply the governance rule only to enqueued messages, or lazily when requests are popped by a message delivery thread. The request is then passed to the virtual environment firewall 52. According to one embodiment of the present invention, the virtual environment firewall 52 loads request selection criteria for each governance rule and registers the collection of request selection criteria with the messaging module 54. The messaging module 54 then contacts the virtual environment firewall 52 for each request matching a criterion, so that the respective governance rules can be applied to the request. Alternately, the virtual environment firewall 52 can query a rules database to identify governance rules that are relevant for the type of request. The virtual environment firewall 52 can query the rules database upon initiation of the virtual environment firewall 52, or on a periodic basis, to obtain all governance rules associated with all request types. In an alternate embodiment, as each request is processed, the virtual environment firewall 52 can query the rules database based on the request type of the request. It is determined whether the request matches any criteria identified by any rule (step 202). If not, the virtual environment firewall 52 can indicate to the messaging module 54 that the virtual environment controller 50 should process the request (step 208).

If it is determined that the request matches one or more criteria, the first such rule can be applied to the request (step 204). For any particular rule, the application of the rule may result in any of several different outcomes. For example, if the rule determines that the request complies with the rule, the rule may allow the request to proceed without changes. However, if the request does not comply with the governance rule, the virtual environment firewall 52 may prevent the message from being processed by the virtual environment controller 50. Alternatively, the virtual environment firewall 52 may modify the request to comply with the governance rule or may substitute a new request that complies with the governance rule. Once the rule is applied to the request, it is determined whether or not to proceed to the next rule, if any (step 206). If the rule determines that the virtual environment controller 50 should not process the request, then the processing is finished and the messaging module 54 can be apprised that the virtual environment controller 50 should not process the request (step 208). If, however, the rule allows the request to proceed without any changes, then the process returns to step 202 where it is determined whether additional rules should be applied to the request.

FIGS. 5A and 5B illustrate an exemplary governance rule 70 governing a behavior in one of the regions 12 illustrated in FIG. 2. Governance rules according to the present invention can be encoded in any format understandable by the virtual environment firewall 52, such as, for example, the Extensible Markup Language (XML) format. The XML formatted rule can include a script or a formal language, such as C, Java, or Python, for example. If the virtual environment firewall 52 is implemented as a module of the virtual environment controller 50, the governance rules are preferably executed by the virtual environment firewall 52 in a protected sandbox that provides secure access to the other modules of the virtual environment controller 50 so that governance rules can be customized to perform necessary or appropriate operations in the virtual environment 10.

The rule 70 shown in FIGS. 5A and 5B includes a name block 72 identifying the respective governance rule. A description block 74 can provide a textual based description describing the behavior that is governed by the rule 70. An initialization function block 76 can contain the initialization code, as described in greater detail below, to execute upon initial loading of the rule 70. A message criteria block 78 can define the types of requests for which this respective rule 70 would be applied. A code block 80 contains the executable code that implements the rule 70 governing the respective behavior. Upon initial loading of this particular rule 70, the initialization function 'startup' is executed and a list of known banned avatars is extracted from a database. This list is refreshed from the database every ten minutes so that the list remains relatively current. The rule 70 has a criterion that indicates the rule 70 should be applied to requests of type 'VirtualObjectTransferAnnouncement,' which is a type of request in the virtual environment 10 that is sent when a virtual object desires to transfer into the respective region 12. Upon receipt of such a request, the rule 70 determines whether the virtual object associated with the request is on the list of banned avatars. If so, the rule 70 rejects the request; otherwise, the rule 70 allows the request to be processed by the virtual environment controller 50.

FIG. 6 illustrates another exemplary governance rule 70 governing a behavior in one of the regions 12 illustrated in FIG. 2. The rule 70 contains a name block 72, a description block 74, and a message criteria block 78 that serve the same purpose as described with respect to the rule 70 shown in FIGS. 5A and 5B. A code block 80 implements the rule 70, which in this example governs a behavior in the region 12 related to a theme in the region 12. Specifically, it is assumed for the purpose of FIG. 6 that the region 12 relates to a prehistoric time period. The code block 80 checks the virtual object template associated with the virtual object making the transfer announcement to determine whether an ontology associated with the virtual object is a prehistoric ontology. If so, then the request is permitted to be processed by the virtual environment controller 50. If the virtual object is classified using the ontology as not being prehistoric, for example, if the virtual object is a spaceship, the virtual environment firewall 52 prevents the virtual environment controller 50 from processing the message.

Governance rules can include the ability to modify a virtual object in order to make the virtual object suitable for a respective region 12. For example, if an owner of a region 12 desires to protect a certain class of virtual objects in the region 12, such as wildlife virtual objects, from external predator virtual objects, the owner can create a governance rule to favor wildlife virtual objects over predator virtual objects. For example, a governance rule can be created that tests a virtual object template to determine if the virtual object is classified as a predator. If the virtual object is classified as a predator, the governance rule communicates to the interest manager module 64 that the respective predator virtual object's AOI is decreased by ten percent and its aura is increased by ten percent. Such modifications would result in the predator virtual object's aura being broadcast ten percent further, thereby enabling wildlife virtual objects to perceive the predator virtual object sooner. A reduction of the predator virtual object's AOI would reduce the predator virtual object's perception of events by ten percent, thereby reducing the predator virtual object's ability to perceive actions and events associated with prey virtual objects.

The governance rules can also include replacements or substitutions for a virtual object in order to make the virtual object suitable for the region 12. For example, if an owner of a region 12 does not want weapons in the region 12, the owner may create a governance rule that determines when a virtual object is carrying a weapon virtual object and temporarily replaces the weapon virtual object with a NERF® bat virtual object. Such modifications or replacements may be applicable for the entire region 12 or for only a portion of the region 12. For example, weapons may only be prohibited within a trade zone of the region 12. The governance rule creates a temporary license for the original weapon virtual object that only allows the weapon virtual object to exist outside of the trade zone and creates a temporary license for a NERF® bat virtual object that is enabled when the virtual object enters the trade zone. Thus, governance rules can be applied to individual virtual objects that together compose a composite virtual object.

A governance rule can also register a callback with other virtual environment modules to detect situations in which it may be desirable to update or modify a governance rule. For example, a callback function may be registered with the virtual object artificial intelligence module 60 such that the governance rule is invoked when the virtual object artificial intelligence module 60 determines that a virtual object is behaving abnormally, for example, when the virtual object artificial intelligence module 60 detects a virtual object that has a large backlog of messages to process and appears to be ignoring such messages. The virtual environment firewall 52 may, upon learning of this behavior, add a governance rule that prevents the virtual object from transferring to the region 12 in the future.

Governance rules can have associated notifications described within the governance rule. These notifications can include notifying an owner of a region 12 of behavior violations, or notifying users with respective avatars 18 in a respective region 12 of problems occurring in the region 12.

FIG. 7 is an exemplary notification block of a governance rule 70 according to one embodiment of the present invention. The rule 70 includes a name block 72 identifying a name of the rule 70. In this example, the rule 70 relates to a virtual object that appears to have stalled; in other words, a virtual object that is non-responsive. A respective code block 80 has been omitted from FIG. 7 for the sake of illustration. A notification methods block 82 contains a notification method 84A that includes an instant messenger block 86. The instant messenger block 86 includes fields identifying an instant messenger system, a particular account within the instant messenger system, a particular message to send to the account, and a flag indicating that a stack trace should be sent to the account. As will be apparent to those skilled in the art, any suitable debugging or status information may be provided. The instant messenger block 86 thus describes a means for sending an instant message (IM) to an identified individual, presumably an owner of the respective region 12 in which the virtual object has stalled. The notification methods block 82 also includes a notification method 84B, which includes a client avatar selection block 88 identifying a radius within which all avatars 18 should be sent a respective message informing them that the stalled virtual object is being brought offline and apologizing for the inconvenience.

According to one embodiment of the present invention, the virtual environment firewall 52 in one region 12 can collaborate with virtual environment firewalls 52 in other regions 12. The virtual environment firewall 52 may also collaborate with a third party entity, such as a virtual world authority, that may provide value added services for the virtual environment firewall 52. Such collaboration can help the virtual environment firewall 52 learn of problems occurring in other regions 12 and preemptively adapt to such problems. For example, a virtual environment firewall 52 can receive a notification from another virtual environment firewall 52 that identifies a malicious virtual object. The virtual environment firewall 52 can incorporate the virtual object information provided in the notification into a new governance rule that prevents the transfer of the malicious virtual object and can generate another governance rule that prevents the propagation of any messages within the respective region 12 associated with the malicious virtual object.

Preferably, virtual environment firewalls 52 authenticate notifications received from other virtual environment firewalls 52. Such authentications can include a digital signature proving the authenticity of the virtual environment firewall 52. Alternately, the virtual environment firewall 52 may be configurable to specifically identify from which hosts 14 in the distributed virtual environment 10 the virtual environment firewall 52 will accept notifications. The virtual environment firewall 52 may subscribe to the respective host 14 or listen to a well known multicast channel on which virtual environment firewalls 52 broadcast notifications. Collaboration between virtual environment firewalls 52 can also include sharing rule sets. For example, a single entity may own several hosts 14 operating in different respective regions 12 and may have configured each respective virtual environment firewall 52 to synchronize their governance rule sets.

According to one embodiment of the present invention, messages communicated between virtual environment firewalls 52 can include configuration messages and notification messages. A configuration message from an authenticated source includes a configuration change that the receiving virtual environment firewall 52 is being requested to apply. A notification message indicates a situation or problem that another virtual environment firewall 52 or a third party has announced. Preferably, virtual environment firewall 52 messages are digitally signed to prove authenticity. Moreover, each virtual environment controller 50 may be provided a public key and a private key by a virtual world authority. The public key can be hosted by the virtual world authority or hosted in a distributed data structure, such as a distributed hash table (DHT).

Figure 8:
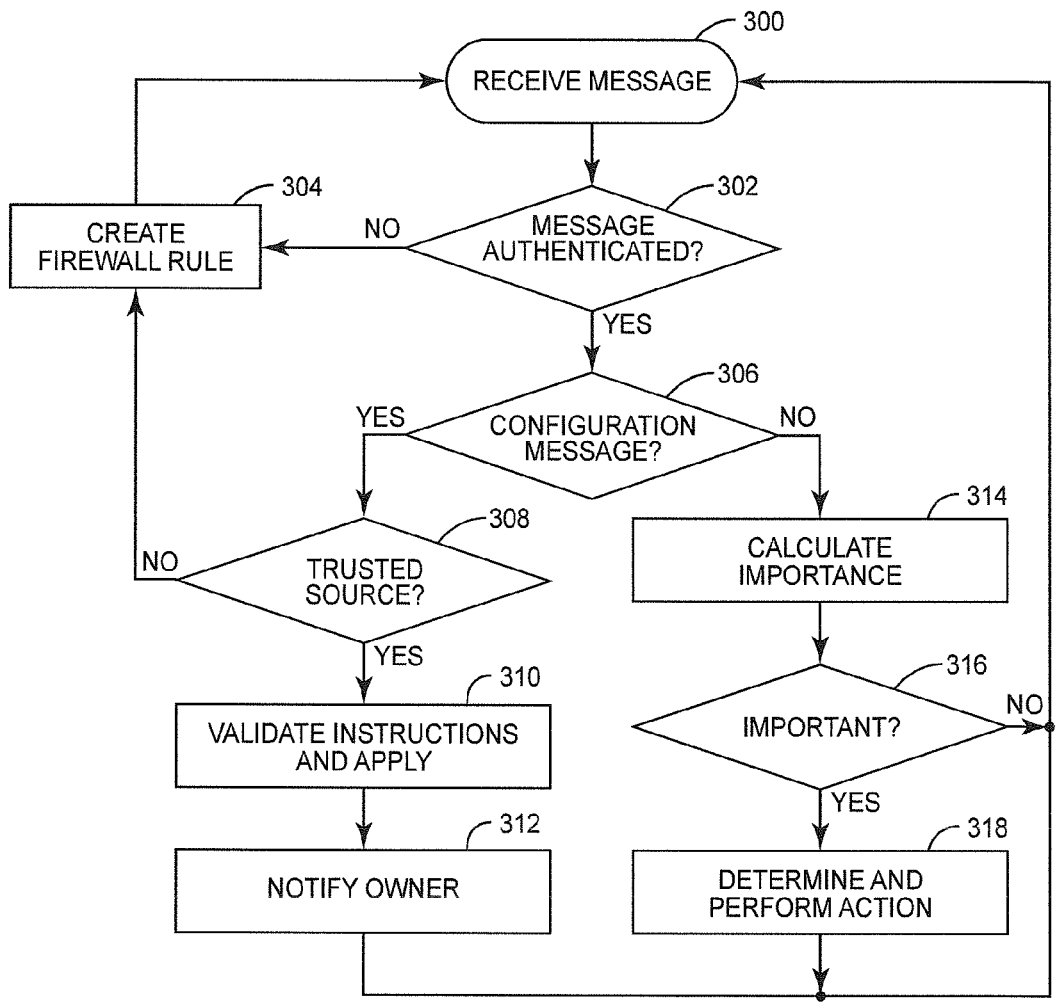
FIG. 8 is a flow diagram illustrating a process for virtual environment firewall collaboration according to one embodiment of the present invention.

FIG. 8 is a flow diagram illustrating a process for virtual environment firewall collaboration according to one embodiment of the present invention. The virtual environment firewall 52 receives a message from another virtual environment firewall 52 (step 300). The integrity of the message can be authenticated by validating a digital signature of the message (step 302). If the message signature is invalid, then the virtual environment firewall 52 can generate a governance rule blocking subsequent messages from the source (step 304). If the signature is valid, then message metadata is examined to determine whether the message is a configuration message or a notification message (step 306). If the message is a configuration message, then it is determined whether the source of the message is a trusted source such as a virtual world authority, or another virtual environment controller operated by the same owner as the respective virtual environment controller associated with the virtual environment firewall 52 (step 308). If the message is not from a trusted source, then a governance rule can be created prohibiting future messages from this source (step 304). Assuming the source is a trusted source, then the configuration instructions can be validated and applied (step 310). Configuration instructions can include, for example, adding, removing, or modifying an existing governance rule. An owner of the respective region 12 may be notified regarding the configuration message (step 312). The notification to the owner may include the ability for the owner to approve, cancel, or delay the configuration request.

If the message type is not a configuration message, then it is a notification type message. An importance of the notification message may be calculated (step 314). The importance may be a factor of a type or severity of the problem, a virtual environment distance from the problem, or a number of independent verifications of the same problem or similar problems. The importance calculation can be defined in a configuration file to allow for an owner of a region 12 to tailor a formula for that respective region 12. The importance calculation score can be compared to an importance threshold to determine whether the problem is significant or trivial (step 316). The importance threshold may be configurable. If the calculated importance is below the importance threshold, the processing for that message ends and the process starts back at step 300. If the calculated importance is greater than the importance threshold, then an action may be performed (step 318). Such actions may include a notification mechanism as described with respect to the configuration message.

FIG. 9 is a configuration message 90 received by the virtual environment firewall 52 from another virtual environment firewall 52 according to one embodiment of the present invention. The configuration message 90 can include a description block 92 describing the purpose of the configuration message 90. A rule update block 94 can include a name block 96 identifying the rule that will be updated. A code block 98 can include an updated version of code that should replace existing code in an existing governance rule. For example, the configuration message 90 shown in FIG. 9 updates the prehistoric theme rule 70 shown in FIG. 6 to allow virtual objects that are classified using an ontology as being close to 'Jurassic' to enter the region 12.

FIG. 10 is a notification message 100 received by the virtual environment firewall 52 from another virtual environment firewall 52 according to one embodiment of the present invention. The notification message 100 can include a virtual object identifier (ID) block 102 identifying a respective virtual object in the region 12. A problem block 104 can identify a particular problem associated with the virtual object. For example, in this illustration the problem relates to a virtual object that is sending too many messages. A virtual world location 106 can identify the location of the errant virtual object.

FIG. 11 is an exemplary notification action 110 code segment executed upon determining that a notification importance exceeds a threshold importance. The notification action 110 includes an importance criteria block 112 identifying a range of importance scores defining when this respective notification action 110 should be executed. The notification action 110 also includes a code block 114 containing instructions that should be executed if the importance criteria is within the identified range. The code block 114 includes instructions for obtaining an identification of a virtual object associated with the notification action 110 and generating a governance rule that permanently blocks the virtual object from the respective region 12.

Figure 12:
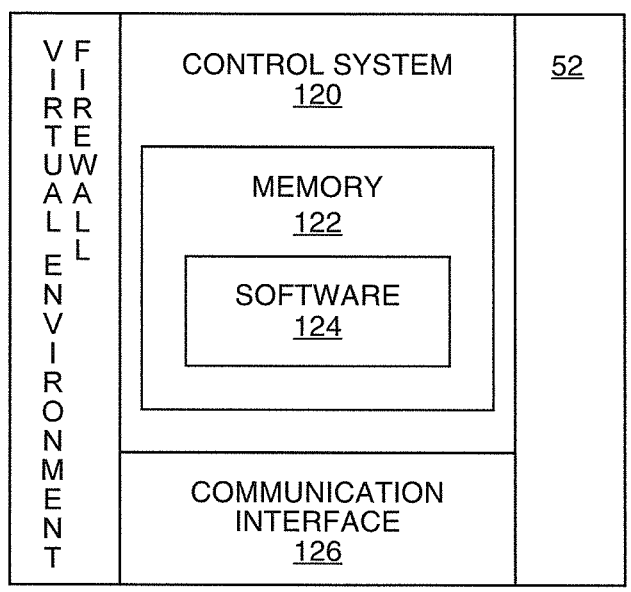
FIG. 12 is a block diagram showing elements of a virtual environment firewall according to one embodiment of the present invention.

FIG. 12 is a block diagram showing elements of a host 14 according to one embodiment of the present invention. The host 14 can include a control system 120 containing a memory 122 that includes software 124 suitable for executing the functionality described herein. The host 14 can include a communication interface 126 over which the host 14 can communicate with other hosts 14 or client applications.

Those skilled in the art will recognize improvements and modifications to the preferred embodiments of the present invention. All such improvements and modifications are considered within the scope of the concepts disclosed herein and the claims that follow.

What is claimed is:

1. A method of operating a first firewall for a virtual environment controller comprising:
receiving, from a second firewall, a configuration message that identifies a virtual environment entity;
in response to receiving the configuration message, generating a governance rule that prohibits entry of the virtual environment entity into a virtual environment region of a virtual environment associated with the first firewall;
receiving, by the first firewall, a message from the virtual environment entity intended for the virtual environment controller and having a request associated with the virtual environment entity, the request comprising a request to transfer into the virtual environment region;
determining, by the first firewall, whether the request complies with the governance rule of the virtual environment controller; and
based on the governance rule, processing the message, by the first firewall, to prevent the request from being processed by the virtual environment controller, thereby preventing entry of the virtual environment entity into the virtual environment region.

2. The method of claim 1 wherein processing the message to prevent the request from being processed by the virtual environment controller comprises blocking the message from being sent to the virtual environment controller.

3. The method of claim 1 wherein processing the message to prevent the request from being processed by the virtual environment controller comprises indicating to the virtual environment controller that the request does not comply with the governance rule.

4. The method of claim 1 further comprising causing a virtual object to appear in the virtual environment region in proximity to the virtual environment entity, wherein travel into the virtual environment region by the virtual environment entity is inhibited by the virtual object.

5. The method of claim 1 wherein the virtual environment controller employs a plurality of virtual environment rules to control the virtual environment region.

6. The method of claim 1 further comprising selecting the governance rule based on a request type associated with the request.

7. The method of claim 6 wherein the request type comprises a virtual environment entity transfer request type.

8. The method of claim 1 further comprising authenticating the second firewall, and modifying the governance rule in response to authenticating the second firewall.

9. The method of claim 1 further comprising receiving a notification message, authenticating a source of the notification message, generating a second notification message, and forwarding the second notification message to a plurality of virtual objects in the virtual environment region.

10. The method of claim 1 further comprising receiving a notification message, authenticating a source of the notification message, generating a second notification message, and forwarding the second notification message to an owner of the virtual environment controller.

11. The method of claim 1 wherein the virtual environment entity is an avatar.

12. The method of claim 1 further comprising obtaining the governance rule from a virtual environment authority.

13. A virtual environment firewall comprising:
a message interface for receiving messages; and
a control system coupled to the message interface and adapted to:
receive, from a remote virtual environment firewall, a configuration message that identifies a virtual environment entity;
in response to receiving the configuration message, generate a governance rule that prohibits entry of the virtual environment entity into a virtual environment region of a virtual environment associated with the virtual environment firewall;
receive a message from the virtual environment entity intended for a environment controller and having a request associated with the virtual environment entity, the request comprising a request to transfer into the virtual environment region;
determine whether the request complies with the governance rule of the virtual environment controller; and
based on the governance rule, process the message to prevent the request from being processed by the virtual environment controller, thereby preventing entry of the virtual environment entity into the virtual environment region.

14. The virtual environment firewall of claim 13 wherein the virtual environment controller employs a plurality of virtual environment rules to control the virtual environment region.

15. A non-transitory computer-usable medium having computer readable instructions stored thereon for execution by a processor to perform a method of operating a first firewall for a virtual environment controller comprising:
receiving, from a second firewall, a configuration message that identifies a virtual environment entity;
in response to receiving the configuration message, generating a governance rule that prohibits entry of the virtual environment entity into a virtual environment region of a virtual environment associated with the first firewall;
receiving, by the first firewall, a message from the virtual environment entity intended for the virtual environment controller and having a request associated with the virtual environment entity, the request comprising a request to transfer into the virtual environment region;
determining, by the first firewall, whether the request complies with the governance rule of the virtual environment controller; and
based on the governance rule, processing the message, by the first firewall, to prevent the request from being processed by the virtual environment controller, thereby preventing entry of the virtual environment entity into the virtual environment region.

* * * * *